(12) United States Patent
Dreps et al.

(10) Patent No.: US 6,906,550 B2
(45) Date of Patent: Jun. 14, 2005

(54) MODABLE DYNAMIC TERMINATOR FOR HIGH SPEED DIGITAL COMMUNICATIONS

(75) Inventors: Daniel Mark Dreps, Georgetown, TX (US); John Cummings Schiff, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 9 days.

(21) Appl. No.: 10/455,166

(22) Filed: Jun. 5, 2003

(65) Prior Publication Data

US 2004/0246021 A1 Dec. 9, 2004

(51) Int. Cl.[7] .................. H03K 17/16; H03K 19/003
(52) U.S. Cl. ...................................... 326/30; 326/86
(58) Field of Search ............................ 326/30, 26, 27, 326/86

(56) References Cited

U.S. PATENT DOCUMENTS 6,359,465 B1 * 3/2002 Hui .............................. 326/30
6,501,293 B2 * 12/2002 Braceras et al. ............. 326/30

* cited by examiner

Primary Examiner—Daniel D. Chang
(74) Attorney, Agent, or Firm—Duke W. Yee; Mark E. McBurney; Theodore D. Fay, III

(57) ABSTRACT

A terminator circuit for use on a pin of an integrated circuit (IC) is disclosed. A preferred embodiment of the present invention includes a clamp circuit that turns on when the voltage at the pin exceeds a threshold value (either an upper or lower bound). Logic and biasing circuitry are used to allow multiple modes of operation by adjusting the threshold values. A particular mode may be selected at any given time so as to strike an appropriate balance between signal quality and power consumption with respect to a particular terminator or set of terminators. This prevents excessive power consumption due to terminator circuitry at inactive or infrequently active IC pins.

15 Claims, 1 Drawing Sheet

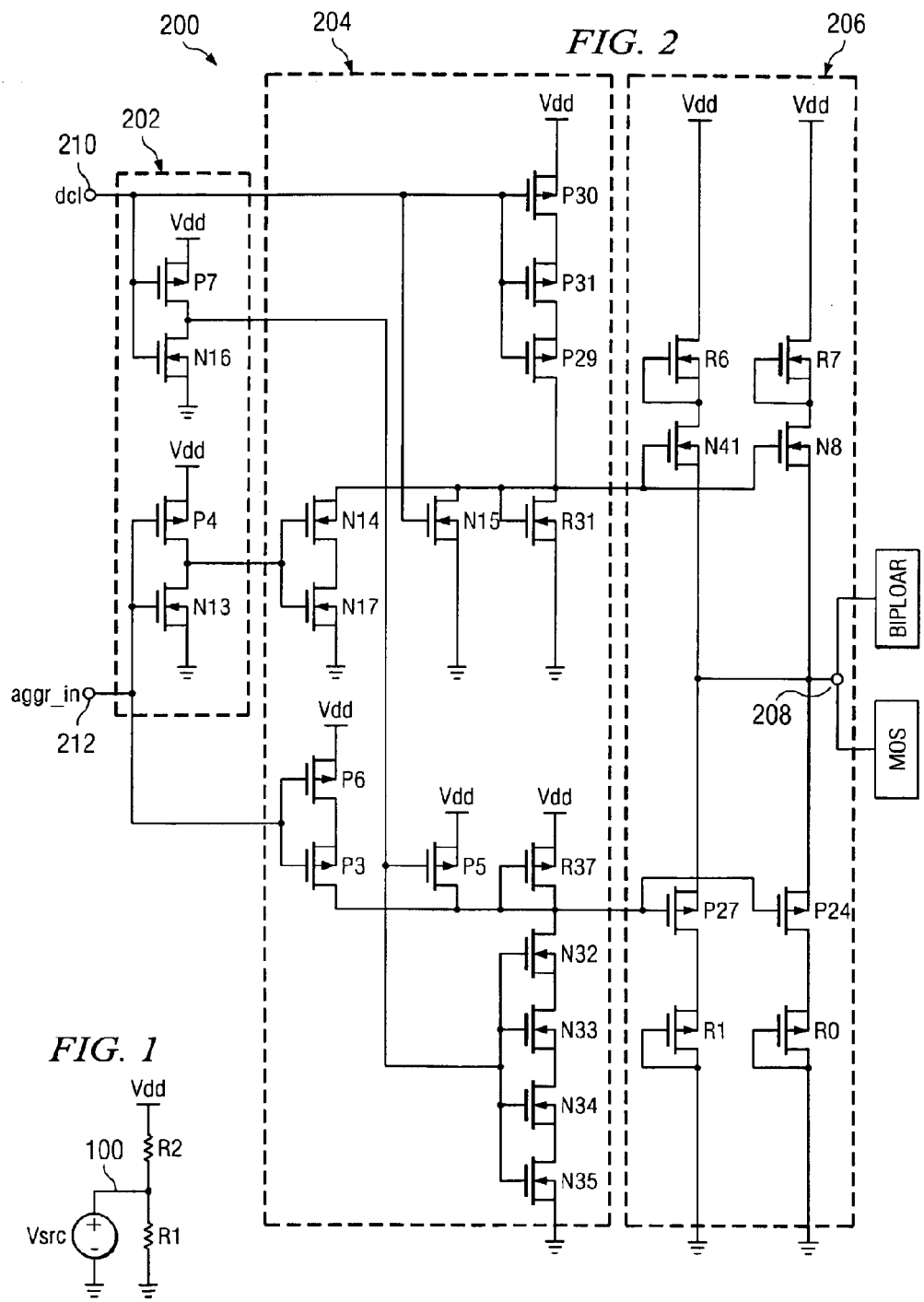

MODABLE DYNAMIC TERMINATOR FOR HIGH SPEED DIGITAL COMMUNICATIONS

BACKGROUND OF THE INVENTION

1. Technical Field

The present invention is related to terminators for electrical connections in digital electronic applications. Specifically, the present invention is directed toward a terminator that allows for different modes of operation in order to balance performance and power consumption.

2. Description of Related Art

All electrical circuits exhibit non-ideal characteristics. The task of a circuit designer is to find suitable models for the behavior of the circuit being designed, so that the model closely approximates the actual behavior of a real circuit. Such a model may be used to obtain initial values for component parameters (such as resistances and capacitances). The designer may then further adjust or "tweak" the design as necessary to account for the inherent inaccuracies in the design model. This design approach is pervasive in Electrical Engineering.

Perhaps the most widely employed design assumption used in modeling electrical circuits is to assume that all signals in a circuit propagate through the circuit at an infinite speed (i.e., without any propagation delay). Although modern physics tells us that this assumption is entirely false, it is nonetheless a valuable analytical simplification and one that can be applied in an enormous number of settings. This assumption of a "zero propagation delay" breaks down, however, in very high speed or timing-sensitive circuits or when a signal must travel a significant distance before reaching its destination. When these sort of conditions occur, it then becomes necessary to adopt a different model.

When "zero propagation delay" can no longer be assumed, engineers typically employ what is known as a "transmission line" model, so called because propagation delay becomes a significant factor in the transmission lines used for power or telephone signal transmission, where electrical signals must travel relatively long distances, such that propagation delays become relevant. A transmission line has a characteristic impedance, which reflects the transmission line's tendency to impede the propagation of a signal travelling along the transmission line.

When a transmission line is terminated by a load (such as a resistor, transistor, or other circuit element), the impedance of the load and the characteristic impedance of the transmission line have a significant effect on the ability of the transmission line to accurately transmit the signal that is used to drive the load. The well-known "maximum power transfer theorem" from elementary circuit theory states that maximum power is transferred to the load when the load impedance matches the impedance of the driving circuit, and that less than the maximum amount of available power is transferred when there is an impedance mismatch. In the case of a transmission line, the available power that fails to be transferred to the load is "reflected" away from the load and back toward the driving circuit (note that this reflection phenomenon becomes perceptible in a transmission line model, since a non-zero propagation delay is assumed). The fraction of power that is reflected away from a mismatched load is given as $$\gamma = \frac{Z_L - Z_0}{Z_L + Z_0}, \qquad (1)$$

where $Z_L$ and $Z_0$ are the load impedance and the characteristic impedance of the transmission line, respectively.

Where $Z_L$ and $Z_0$ are matched, it is easy to see that $\gamma=0$. Thus, it is standard engineering practice to terminate transmission lines (or electrical connections modeled as transmission lines) in an impedance that matches the characteristic impedance of the line. For example, North American cable television cables are designed to be terminated with a 75 Ω load. Terminating a transmission line in a matching impedance not only results in an efficient transfer of power to the load, but also preserves signal integrity, as reflection due to impedance mismatching can cause signal degradation, including overshoot and undershoot (amplitude-related distortion), and jitter (phase-related distortion).

In modern high-speed digital circuits, transmission line effects can be observed in circuits of relatively small size. This is a particularly troublesome phenonmenon in board-level design, where the connections between integrated circuits (ICs) on a circuit board may act like transmission lines. In such instances, it is important to terminate the connections (pins) to integrated circuits in matching impedances, so as to reduce signal degradation due to transmission-line effects. A typical terminator circuit, as employed in the art, is depicted in FIG. 1.

Here resistor R1 and resistor R2 make up the terminator. Resistors R1 and R2 are connected to each other and transmission line 100 at node 102. Resistors R1 and R2 are also tied to ground and a positive voltage supply, respectively. Node 102 is the point of connection to an integrated circuit from transmission line 100. The impedance of the terminator (i.e., the two resistors together) is given by $$R_{total} = \frac{R_1 R_2}{R_1 + R_2}, \qquad (2)$$

as is well-known in the art. Resistors R1 and R2 prevent degradation of the input signal represented by voltage source Vsrc, by matching the characteristic impedance of transmission line 100, which connects voltage source Vsrc with the terminator comprising resistors R1 and R2.

One of ordinary skill in the art, however, will recognize that because resistors R1 and R2 themselves form a complete circuit with ground and the positive voltage supply, resistors R1 and R2 constantly dissipate power in the form of heat. In a very large scale integration (VLSI) circuit having many pins, even a small amount of current flowing through these terminator resistors can add up to an unacceptably high amount of power dissipation. Thus, there is a need for a terminator circuit that minimizes power dissipation in a very large scale integrated circuit design.

SUMMARY OF THE INVENTION

The present invention provides a terminator circuit for use on a pin of an integrated circuit (IC). A preferred embodiment of the present invention includes a clamp circuit that turns on when the voltage at the pin exceeds a threshold value (either an upper or lower bound). Logic and biasing circuitry are used to allow multiple modes of operation by adjusting the threshold values. A particular mode may be selected at any given time so as to strike an appropriate balance between signal quality and power consumption with respect to a particular terminator or set of terminators. This prevents excessive power consumption due to terminator circuitry at inactive or infrequently active IC pins.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a schematic diagram of a typical terminator circuit as known in the art; and FIG. 2 is a schematic diagram of a terminator circuit in accordance with a preferred embodiment of the present invention.

DETAILED DESCRIPTION OF THE PREFERRED EMBODIMENTS

FIG. 2 is a schematic diagram of a terminator circuit 200 in accordance with a preferred embodiment of the present invention. Terminator circuit 200 is a MOS (metal-oxide semiconductor) integrated circuit, but one of ordinary skill in the art will recognize that the teachings of the present invention may be applied to other circuit technologies, such as bipolar-transistor-based circuits, GaAs (gallium arsenide) semiconductors, and the like.

As is generally the case with MOS-based integrated circuits, terminator circuit 200 is comprised primarily of MOSFETs (MOS field-effect transistors). In general, N-channel MOSFETs in FIG. 2 are generally labeled with reference symbols that begin with the letter "N" (e.g., MOSFET N13), and P-channel MOSFETs are generally labeled with reference symbols that begin with the letter "P," according to common practice. A number of MOSFETs in FIG. 2, however, are labeled with reference symbols that begin with the letter "R," as resistors are generally labeled in the electronics field. Those MOSFETs in FIG. 2 that are labeled in this way (e.g., MOSFET R6) are so labeled because they are being used as resistive elements in circuit 200 (i.e., they are used as if they were resistors).

It is well-known in the integrated circuit field that a transistor (e.g., field-effect transistor, bipolar junction transistor (BJT), etc.) may be used as a resistive element by connecting the gate of the transistor (or the base, in the case of a BJT) to one of the other transistor terminals. This is commonly referred to as "diode-connecting" a transistor, since a diode-connected BJT will function essentially like a diode. For example, the gate of MOSFET R6 (an N-channel MOSFET) is connected to the drain MOSFET R6. In the interest of conceptual clarity, then, these "R" components will be hereinafter described as "resistive elements." The other P- and N-channel MOSFETs will be hereinafter referred to as "PFETs" and "NFETs," respectively.

Terminator circuit 200 is conceptually divided into three main sections, logic section 202, biasing section 204, and clamp section 206. Node 208 connects terminator circuit 200 with the electrical connection to be terminated (e.g., such as a pin of an integrated circuit). Inputs 210 and 212, labeled "dcl" and "aggr_in" respectively, are used to select a mode of operation for terminator circuit 200. In this preferred embodiment, terminator circuit 200 supports two modes of operation in which clamp section 206 is enabled. Terminator circuit 200 may also be disabled using "dcl" input 210. One of ordinary skill in the art will recognize, however, that more or fewer modes may be supported by an actual embodiment without departing from the scope and spirit of the present invention The "termination" function of terminator circuit 200 is primarily performed by NFETs N41 and N8, PFETs P27 and P24, and resistive elements R6, R7, R1, and R0, which together form two clamps connected in parallel to node 208. The principal of operation of these clamps may be more easily understood by considering the operation of a single clamp. We thus turn our attention to the clamp formed by resistive element R7, NFET N8, PFET P24, and resistive element R0, which are connected in a cascode (totem-pole) configuration.

The operation of this clamp is largely controlled by the node voltages the gates of NFET N8 and PFET 24, as measured with respect to node 208. When the voltage at node 208 falls sufficiently low with respect to the voltage at the gate of NFET N8, NFET N8 turns on and current begins to flow from the positive supply rail (Vdd), through resistive element R7, to pull up the voltage at node 208. Likewise, when the voltage at node 208 becomes sufficiently large with respect to the voltage at the gate of PFET P24, PFET P24 turns on and resistive element R0 begins to sink current from node 208 to ground, thus pulling down the voltage at node 208.

Essentially, then, NFET N8 and PFET P24 act as switches that selectively connect and disconnect terminating impedances (resistive elements R7 and R0) to provide protection against overshoot, undershoot, and jitter, as needed. Because these impedances are switched in and out of the circuit, the average power dissipated through these impedances over time is reduced. The threshold voltage at which the impedances are switched in and out of the circuit is determined by the voltages present at the gates of NFET N8 and PFET P24. Since resistive elements R6 and R1, NFET N41, and PFET P27 form a second clamp that is structurally identical to and connected in parallel with the clamp formed by R7, NFET N8, PFET P24, and resistive element R0, one of ordinary skill in the art will recognize that this second clamp operates in the same fashion and is biased by the same gate voltages.

Moving backwards through circuit 200, it can be seen that biasing section 204 supplies bias voltages to the gates of NFETs N41 and N8 and to the gates of PFETs P27 and P24. The actual amount of bias voltage applied to the gates of these transistors is determined according to logic section 202, which, in turn, is controlled by "dcl" input 210 and "aggr_in" input 212.

"dcl" input 210 is the "disable clamp" input to circuit 200. When "dcl" input 210 is high (i.e., set to a logic value of 1), clamp section 206 is said to be "disabled." Specifically, when "dcl" input 210 is high, PFETs P30, P31, and P29 (the gates of which are directly coupled to "dcl" input 210) are turned off, thus preventing NFETS N41 and N8 from receiving the positive bias voltage necessary to enable NFETS N41 and N8 to turn on. NFET N15 is simultaneously turned on by "dcl" input 210, to bring the gate voltages of NFET N41 and NFET N8 to ground potential. Meanwhile, PFET P7 and NFET N16 form a CMOS (complementary MOS) inverter and invert the high signal from "dcl" input 210 to apply a logic low signal to the gate of PFET P5 and to the gates of NFETs N32–N35. This causes PFET P5 to turn on and causes NFETs N32–N35 to turn off, thus bringing the gate voltages of PFETs P27 and P24 to Vdd (positive supply rail) potential, which prevents PFETs P27 and P24 from being able to turn on.

When "dcl" input 210 is brought to a logic low value, clamp section 206 is said to be "enabled." NFET N15 and PFET P5 are turned off and PFETS P30, P31, and P29 and NFETs N32–N35 are turned on. PFETs P30, P31, and P29, once turned on, form a voltage divider with resistive element R31, to apply a positive bias voltage to the gates of NFETs N41 and N8, thus enabling the "pull-up" half of clamp section 206. Likewise, NFETs N32–N35, once turned on, form a voltage divider with resistive element N37 to apply a positive bias voltage to the gates of PFET P27 and PFET P24, thus enabling the "pull-down" half of clamp section 206.

The particular positive bias voltages applied to the gates of NFETs N41 and N8 and PFETs P27 and P24 will differ according to the mode in which terminator circuit 200 is operated. The mode that is used by circuit 200, when enabled, is determined by "aggr_in" input 212. In this preferred embodiment, two modes of operation (and thus, two sets of positive bias voltages) are defined, namely an aggressive mode and a non-aggressive mode. These two modes are provided to allow a finer level of control over the tradeoff between performance and power dissipation to be made, over and above the control provided by "dcl" input 210.

When "aggr_in" input 212 is set to a logic low value, circuit 200 is said to be operating in non-aggressive mode. Specifically, the logic low at "aggr_in" input 212 is inverted to a logic high by the CMOS inverter made up of PFET P4 and NFET N13. This logic high is applied to the gates of NFETs N14 and N17, which turns on NFETs N14 and N17. This causes NFETs N14 and N17 to function as a parallel resistance in the circuit with respect to resistive element R31. As the overall resistance of a set of parallel resistances is lower than any of the individual resistances, this causes the ground-connected portion of the voltage divider formed with PFETs P29–P30 and resistive element R31 to have a lower resistance than the vdd-connected portion of the voltage divider (the vdd-connected portion being made up of PFETs P29–P30, and the ground-connected portion being made up of NFETs N14 and N17 and resistive element R31). This has the effect of lowering the bias voltage applied to the gates of NFETs N41 and N8, which requires node 208 to reach a higher voltage threshold to turn on NFETs N41 and N8 than would be necessary if NFETs N14 and N17 were turned off. Thus, this mode is called "non-aggressive," because the lower bias voltage makes NFETs N14 and N17 less likely to turn on and, hence, less aggressive in trying to pull up the signal at node 208.

The pull-down portion of circuit 200 operates similarly in non-aggressive mode. PFETs P6 and P3 are turned on, which reduces the effective resistance of the vdd-connected portion of the voltage divider formed with NFETs N32–N35 and thus raises the bias voltage applied to the gates of PFETs P27 and P24, which raises the threshold for turning on the PFETs P27 and P24 in the pull-down portion of clamp section 206.

In aggressive mode, on the other hand, "aggr_in" is at a logic high level and NFETs N14 and N17, as well as PFETs P6 and P3, are turned off. This has the effect of increasing the bias voltage applied to the gates of NFETs N41 and N8 and decreasing the bias voltage applied to the gates of PFETs P24 and P27. This causes clamp section 206 to be more aggressive in trying to pull-up or pull-down the voltage at node 208, since the thresholds for switching on NFETs N41 and N8 and PFETs P24 and P27 are reduced (in sense that not as high a voltage is needed at node 208 to initiate a pull-down by PFETs P27 and P24 and not as low a voltage is needed at 208 to initiate a pull-up by NFETs N41 and N48.

To summarize, terminator circuit 200 follows the truth table provided in Table I for determining whether clamp section 206 is to be operated in aggressive mode, non-aggressive mode, or disabled.

TABLE I

| dcl | aggr_in | Mode |
| --- | --- | --- |
| 0 | 0 | Clamp section on in non-aggressive mode |
| 0 | 1 | Clamp section on in aggressive mode |
| 1 | any | Clamp section off (disabled) |

One of ordinary skill in the art will appreciate that a terminator design in accordance with the teachings of the present invention may be used in a variety of contexts in which an electrical connection requires termination with an appropriate impedance. In particular, an integrated circuit utilizing a terminator in accordance with the teachings of the present invention to terminate integrated circuit pins may utilize the multimode features of such a terminator in order to dynamically adjust the balance between performance and power consumption as needed for the integrated circuit's task at hand. For example, pins that are not currently being used can have their terminators disabled. As a further example, pins that must receive high-speed signals can have their terminators placed in aggressive mode, for maximum performance, while less timing-critical pins can utilize pins in non-aggressive mode.

The description of the present invention has been presented for purposes of illustration and description, and is not intended to he exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A terminator circuit for terminating an electrical connection, the terminator circuit comprising:

at least one pull-up circuit connected between a higher-voltage supply rail and the electrical connection, wherein the at least one pull-up circuit turns on in response to a voltage at the electrical connection dropping below a lower threshold value;

at least one pull-down circuit connected between the electrical connection and a lower-voltage supply rail, wherein the at least one pull-down circuit turns on in response to the voltage at the electrical connection exceeding an upper threshold value;

biasing circuitry connected to the at least one pull-up circuit and the at least one pull-down circuit, wherein the biasing circuitry generates bias signals that determine the lower threshold value and the upper threshold value, and wherein the lower threshold value dis selected fro a first plurlity of voltage values and the upper threshold value is selected from a second plurality of voltage values; and logic circuitry connected to the biasing circuitry, wherein the logic circuitry receives as an input a designation of a mode for the terminator circuit selected from a plurality of modes, and wherein the plurality of modes comprises at least three modes, and wherein the logic circuitry directs the biasing circuitry to produce bias signals that correspond to the mode designated by the input to the logic circuitry.

2. The terminator circuit of claim 1, wherein the terminator circuit is incorporated into a metal-oxide semiconductor(MOS) integrated circuit.

3. The terminator circuit of claim 1, wherein the terminator circuit is incorporated into a bipolar-transistor integrated circuit.

4. The terminator circuit of claim 1, wherein the plurality of modes includes an off mode, and wherein neither the at least one pull-up circuit nor the at least one pull-down circuit turn on when in the off mode.

5. The terminator circuit of claim 1, wherein additional circuitry on the integrated circuit selects a mode for the terminator circuit from the plurality of modes using the logic circuitry.

6. A terminator circuit for terminating an electrical connection, the terminator circuit comprising:
- at least one pull-up circuit connected between a higher-voltage supply and the electrical connection, wherein the at least one pull-up circuit turns on in response to a voltage at the electrical connection dropping below a lower threshold value;
- at least one pull-down circuit connected between the electrical connection and a lower-voltage supply rail, wherein the at least one pull-down circuit turns on in response to the voltage at the electrical connection exceeding an upper threshold value;
- biasing circuitry connected to the at least one pull-up circuit and the at least one pull-down circuit, wherein the biasing circuitry generates bias signals that determine the lower threshold value and the upper threshold value; and
- logic circuitry connected to the biasing circuitry, wherein the logic circuitry receives as an input a designation of a mode for the terminator circuit selected from a plurality of modes, and wherein the logic circuitry directs the biasing circuitry to produce bias signals that correspond to the mode designated by the input to the logic circuitry;
- wherein the at least one pull-up circuit and the at least one pull-down circuit each include a resistive element and a biasing transistor connected in a cascode configuration, and wherein the biasing transistor receives a bias signal from the biasing circuitry.

7. The terminator circuit of claim 6, wherein the resistive element is a diode-connected transistor.

8. A terminator circuit for terminating an electrical connection, the terminator circuit comprising:
- at least one pull-up circuit connected between a higher-voltage supply rail and the electrical connection, wherein the at least one pull-up circuit turns on in response to a voltage at the electrical connection dropping below a lower threshold value;
- at least one pull-down circuit connected between the electrical connection and a lower-voltage supply rail, wherein the at least one pull-down circuit turns on in response to the voltage at the electrical connection exceeding an upper threshold value;
- biasing circuitry connected to the at least one pull-up circuit and the at least one pull-down circuit, wherein the biasing circuitry generates bias signals that determine the lower threshold value and the upper threshold value; and
- logic circuitry connected to the biasing circuitry, wherein the logic circuitry receives as an input a destination of a mode for the terminator circuit selected from a plurality of modes, and wherein the logic circuitry directs the biasing circuitry to produce bias signals that correspond to the mode designated by the input to the logic circuitry;
- wherein the plurality of modes includes a more-aggressive mode and a less-aggressive mode, and wherein the at least one pull-up circuit and the at least one pull-down circuit are biased so as to be more likely to turn on when in the more-aggressive mode than when in the less-aggressive mode.

9. A terminator circuit for use in an integrated circuit, comprising:
- a first resistive element connected between a higher power supply rail and an integrated circuit pin;
- a second resistive element connected between the integrated circuit pin and a lower power supply rail;
- at least one biasing component, wherein the at least one biasing component limits current flow through the first resistive element and the second resistive element in accordance with a mode selected from a plurality of modes associated with the terminator circuit, wherein the plurality of modes comprises at least three modes; and
- mode-varying circuitry, wherein the mode-varying circuitry, in response to input, varies a degree to which current flow is limited by the at least one biasing component so as to make the plurality of modes selectable.

10. The terminator circuit of claim 9, wherein the at least one biasing component includes a transistor.

11. The terminator circuit of claim 10, wherein the transistor is a field-effect transistor having a source, a gate, and a drain, and the mode-varying circuitry varies the degree to which the at least one biasing component limits current flow by varying a voltage applied to the gate of the field-effect transistor.

12. The terminator circuit of claim 9, wherein at least one of the first resistive element and the second resistive element includes a diode-connected transistor.

13. The terminator circuit of claim 9, wherein the resistive elements have impedance values that match a characteristic impedance associated with a conductor connected to the integrated circuit pin.

14. The terminator circuit of claim 9, wherein the plurality of modes are associated with varying levels of power consumption in the terminator circuit.

15. The terminator circuit of claim 14, further comprising:
- interfacing circuitry configured so as to allow additional circuitry on the integrated circuit to select a mode for the terminator circuit from the plurality of modes.

* * * * *